United States Patent
Poola et al.

(10) Patent No.: US 6,901,897 B2
(45) Date of Patent: Jun. 7, 2005

(54) METHOD AND INTAKE CAM FOR RETAINING EXHAUST RESIDUALS FOR EMISSIONS REDUCTION IN A DIESEL ENGINE

(75) Inventors: Ramesh B. Poola, Naperville, IL (US); Paul Gottemoller, Palos Park, IL (US); Michael B. Goetzke, Orland Park, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/656,976

(22) Filed: Sep. 5, 2003

(65) Prior Publication Data

US 2005/0050880 A1 Mar. 10, 2005

(51) Int. Cl.[7] .................................................. F01L 1/04
(52) U.S. Cl. ................. 123/90.6; 123/90.15; 123/90.16
(58) Field of Search ........................... 123/90.15, 90.16, 123/90.6

(56) References Cited

U.S. PATENT DOCUMENTS

| | | | | | |
|---|---|---|---|---|---|
| 2,344,993 | A | * | 3/1944 | Lysholm | 123/564 |
| 3,574,304 | A | * | 4/1971 | Santi | 123/90.28 |
| 4,084,568 | A | * | 4/1978 | Sato et al. | 123/182.1 |
| 4,538,559 | A | * | 9/1985 | Imamura et al. | 123/90.6 |
| 4,852,527 | A | * | 8/1989 | Beardmore et al. | 123/90.6 |
| 5,927,238 | A | * | 7/1999 | Watson | 123/90.15 |
| 6,055,949 | A | * | 5/2000 | Nakamura et al. | 123/90.16 |
| 6,125,828 | A | * | 10/2000 | Hu | 123/568.14 |

* cited by examiner

*Primary Examiner*—Tu M. Nguyen
(74) *Attorney, Agent, or Firm*—Cary W. Brooks

(57) ABSTRACT

A diesel engine intake cam profile creates two intake valve events separated by a short dwell period each engine cycle. A relatively low valve lift during an engine exhaust event allows a portion of the exhaust gas to flow into an intake manifold and mix with intake air. The intake valve is then nearly closed for a dwell period until a normal intake valve opening occurs, drawing the mixture of air and exhaust gas back into the combustion chamber for compression and burning, upon closure of the intake valves.

7 Claims, 2 Drawing Sheets

METHOD AND INTAKE CAM FOR RETAINING EXHAUST RESIDUALS FOR EMISSIONS REDUCTION IN A DIESEL ENGINE

TECHNICAL FIELD

This invention relates to diesel engines and, more particularly, to a method and intake cam for reducing $NO_x$ in exhaust gas emissions from diesel engines.

BACKGROUND OF THE INVENTION

In-cylinder emissions reduction techniques have been extensively explored to meet future regulated exhaust emissions standards for diesel engines. Exhaust gas recirculation (EGR), the most cost-effective way of reducing $NO_x$ levels from spark-ignition engines, is now being considered for use with compression-ignition (diesel) engines. Major constituents of exhaust gas that are recirculated include $N_2$, $CO_2$, water vapor, and partially burned hydrocarbons, which affects the combustion process through dilution, thermal, and chemical effects. The dilution effect is caused by the reduction in the concentration of oxygen in intake air; the thermal effect is caused by increasing the specific heat capacity of the charge; and the chemical effect results from the dissociation of $CO_2$ and water vapor during combustion. In comparison, the dilution effect is the most influencing factor in altering the combustion process.

EGR can be achieved either by recirculating some of the exhaust leaving the engine back into the engine (known as external EGR) or by retaining a fraction of exhaust that never leaves the engine (known as internal EGR).

When compared to external EGR systems, the internal EGR method provides adequate mixing of the EGR fraction with the intake charge and maintains good distribution among all the cylinders, and effective $NO_x$ reduction without excessively increasing cylinder-specific particulate emissions.

In general, internal EGR can be achieved as a result of valve overlap between the intake and exhaust valve opening events. Depending on intake manifold boost level, exhaust gas back pressure, overlap duration and corresponding valve lifts, this fraction can vary substantially. However, during valve overlap, the internal EGR rate at low speed and load can be too high, in particular engines with high thermal load, where the boosted air is also used to cool the cylinders and/or exhaust valves.

An alternate to fixed valve timing is variable valve timing. It allows individual adjustment of valve timing as a function of speed and load by applying either an electro-mechanical valve train or an electro-hydraulic valve train. Both systems allow for separate control of intake and exhaust valve timing providing the flexibility to control internal EGR rate. In the case of cam driven valve train having a constant cam lobe profile optimized for certain operating conditions, compromises may result such as increased pumping losses caused by retarded exhaust cam phasing or reduced volumetric efficiency due to early intake valve closure.

SUMMARY OF THE INVENTION

In the present invention, a new cam lobe arrangement for intake valves is provided to achieve internal EGR. The intake cam profile is configured to provide two distinct intake valve events per engine cycle.

The first intake valve event precedes the second (main) intake valve event, and has relatively shorter (maximum) lift and duration when compared to main intake valve event. The first intake valve event begins shortly after exhaust valve opening and ends before exhaust valve closing. During a dwell time between the two intake valve events, the intake is kept slightly open with a small lift to prevent seat wear from double intake valve closings.

By opening the intake valve very early (soon after the exhaust valve opens), the exhaust gases in the cylinder are pushed into the intake manifold as long as the cylinder pressure is higher than the intake manifold pressure. The exhaust that is being pushed into the intake manifold will mix with the fresh air in the intake manifold. When the pressure in the cylinder drops below intake manifold pressure, during the exhaust blow down process, flow reversal occurs. The mixture of fresh air and exhaust gases will first enter into the cylinder followed by fresh air during the engine breathing process. At the end of the gas exchange process, this arrangement effectively traps a part of the exhaust gases (residuals) in the cylinder.

Optimizing one or more of the following parameters can vary the residual gas fraction that can be trapped inside the cylinder: (a) beginning of the first intake valve opening timing, lift profile, and duration of valve opening, (b) dwell time between the two intake valve events and lift during the dwell, (c) main intake valve opening time, lift profile and duration of valve opening, (d) exhaust valve opening timing, lift profile and duration, and (e) valve overlap duration between the exhaust valve and intake valve.

In a preferred embodiment, the cam is formed having a base circle with a trapping lobe and a main lobe protruding from the base circle to create the two valve events. A dwell portion connects the trapping lobe and the main lobe and maintains a minimal valve lift between the two intake valve events.

In another embodiment, a small quantity of fuel is injected late in the combustion cycle such that the cylinder pressure will be relatively higher than the intake manifold pressure during the exhaust blow down process. This helps to increase the back flow of exhaust gases into the intake manifold during the first intake valve event and thereby increase the fraction of exhaust residuals that are trapped in the cylinder. Such a fuel (post) injection event can be implemented on engines fitted with electronically controlled fuel injection equipment (for example, a high pressure common rail injection system). This arrangement allows further flexibility in trapping the desired fraction of exhaust residual gases in the cylinder when post injection is coupled with double intake valve events as previously described.

In yet another embodiment, exhaust backpressure is modulated such that the residual gas fraction that is trapped in the cylinder cam be varied to meet the requirements at different engine operating conditions. For example, engines fitted with variable turbocharger geometry allow changing the dynamic exhaust backpressure at any given engine operating condition.

These and other features and advantages of the invention will be more fully understood from the following description of certain specific embodiments of the invention taken together with the accompanying drawings.

DESCRIPTION OF THE PREFERRED EMBODIMENT

Figure 1:
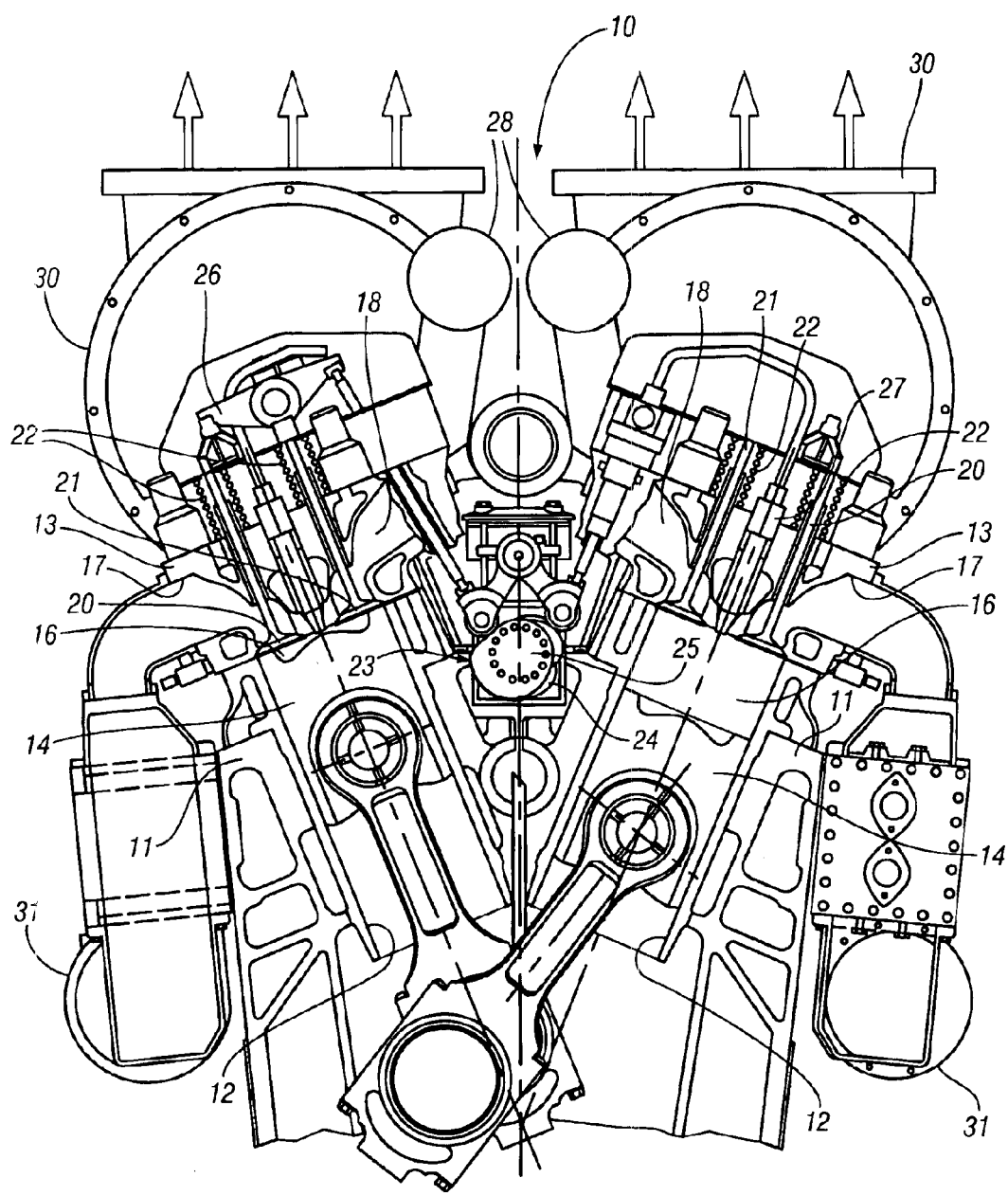
FIG. 1 is a transverse cross-sectional view of a turbocharged diesel engine having a cam-actuated valve train.

Referring first to FIG. 1 of the drawings in detail, numeral 10 generally indicates, as an example, a four stroke cycle turbocharged and intercooled diesel engine intended primarily for rail locomotive applications. The engine 10 has two cylinder banks 11, each having a plurality of cylinders 12 closed by cylinder heads 13. Pistons 14, reciprocable within the cylinders, define variable volume combustion chambers 16 between the pistons and cylinder heads.

The cylinder heads 13 contain intake and exhaust ports 17, 18 that communicate with the combustion chambers and are controlled by intake and exhaust valve 20, 21, respectively, mounted in the cylinder heads and biased by the valve springs 22. The valves are mechanically actuated by intake and exhaust cams 23, 24 of a camshaft 25 driving an associated valve actuating mechanism such as intake rocker arm 26. The fuel injection pumps 27 are actuated by the camshaft. The exhaust ports 18 discharge exhaust products through exhaust manifolds 28 to turbocharger 30. These, in turn, draw in inlet charge air and supply it through intake manifolds 31 to the intake ports 17 at pressures varying with engine operating conditions.

The engine cycle conventionally includes intake, compression, expansion and exhaust strokes of the pistons. Intake charges drawn into the combustion chambers 16 on the intake strokes are compressed with the valves closed. Fuel injected is ignited by the hot compressed gases and the burned gases are expanded, producing power. The combustion products are exhausted providing energy to the turbocharger to boost the pressure of the intake charges. High combustion temperatures in the combustion chambers cause formation of nitrogen oxides ($NO_x$) which it is desired to control.

Figure 2:
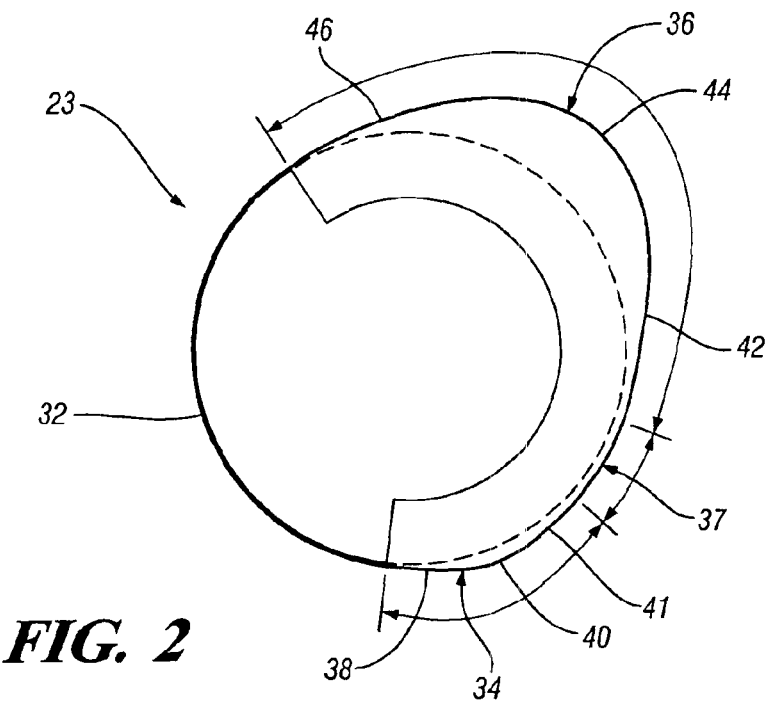
FIG. 2 is a cross-sectional view of a camshaft having an intake cam profile according to the present invention.

Referring to FIG. 2, an exemplary intake cam 23 is shown having a cam profile according to the invention. The cam profile includes a base circle 32 from which protrude a trapping lobe 34, an angularly spaced intake cam main lobe 36 and a slightly raised dwell portion 37 between the lobes 34, 36. The trapping lobe 34 provides a small intake valve lift during the exhaust phase of the engine cycle. The dwell portion 37 substantially closes the valve during a dwell period toward the end of the exhaust phase but holds the valve slightly off its seat to minimize seat wear. The main lobe 36 provides a large intake valve lift during the intake phase of the engine cycle.

In an exemplary embodiment of the intake cam 23, the base circle 32 extends for about 180 degrees between the main lobe 36 and the trapping lobe 34. The trapping lobe extends about 40 degrees, the dwell period extends about 30 degrees and the intake main lobe extends about 110 degrees. A lift curve 38 of the trapping lobe extends outward from one end of the base circle 32 to an apex 40 of the trapping lobe 34, and a closing curve 40 extends from the apex 40 to the beginning of the dwell portion 37. The dwell portion extends from the trapping lobe 34 to the beginning of the main lobe 36. The main lobe also includes a lift curve 42, an apex 44 and a closing curve 46 extending to the base circle 32.

In the exemplary intake cam 23, the height of the main lobe 36 provides approximately 25 mm of associated intake valve lift. However, the valve lift height provided by the main lobe would be varied to suit the application. In addition, the height of the trapping lobe 34 may be varied in a range from 10 to 40 percent of the height of the main lobe. The height of the dwell portion 37 may vary in a range from 1 to 10 percent of the height of the main lobe.

Figure 3:
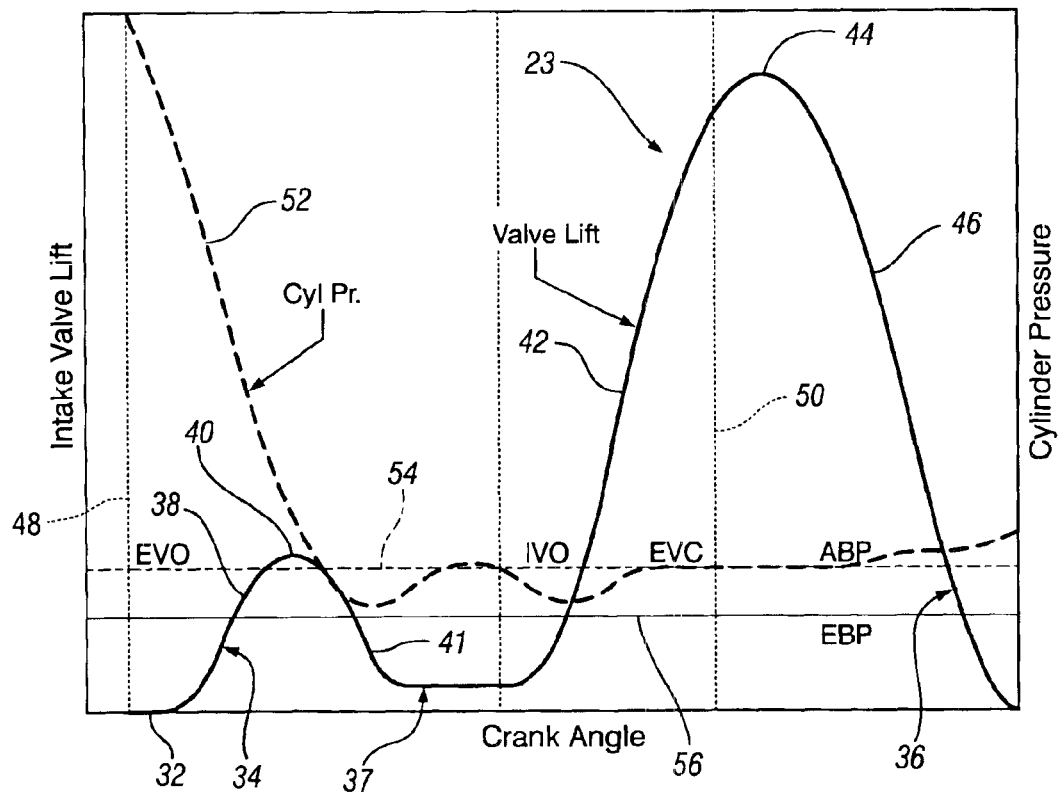
FIG. 3 is a graph showing intake valve lift during exhaust and intake portions of an engine cycle.

FIG. 3 is a graph of intake valve lift versus cam angle for the exemplary cam 23 of FIG. 2 wherein the portions of the double lift curve are indicated with the reference numerals of the corresponding portions of the intake cam 23. In this graph, the trapping lobe 34 subtends about 40 degrees, the dwell period 37 about 30 degrees, the main lobe 36 about 110 degrees and the base circle subtends about 180 degrees. Vertical lines 48, 50 indicate the points of exhaust valve opening (EVO) and exhaust valve closing (EVC) respectively. A phantom line 52 indicates cylinder pressure during exhaust blowdown and through the intake phase. Horizontal lines 54 and 56 indicate the average intake boost pressure and the average exhaust backpressure, respectively. It should be understood that these values are only exemplary and will be varied to suit the particular conditions of a particular engine embodiment.

In operation of the embodiment of FIGS. 1–3, the engine 10 operates generally on the four-stroke cycle wherein sequential strokes of the pistons 14 draw in cylinder charges on the intake strokes and compress the charges on the compression strokes. Fuel is injected near top dead center, is ignited by the hot compressed gases and expanded on the expansion strokes to produce power, and the burned gases are exhausted on the exhaust strokes.

In accordance with the invention, the conventional cycle is modified by operation of the dual intake cam 23. Early in the exhaust stroke of each cylinder, the trapping lobe 34 of the intake cam opens the intake valve, or valves, a small amount, allowing some of the pressurized cylinder gases to flow into the intake port 17 and the connected intake manifold 31. As cylinder pressure drops, the intake valve is substantially closed, trapping the exhaust gases in the intake manifold. The dwell portion of the cam holds the intake valve slightly off its seat to prevent increasing valve seat wear by an additional seating of the valve.

After the dwell, when the cylinder pressure has dropped below the boost pressure of the turbocharged intake manifold, the main intake cam lobe 36 again opens the intake valve, allowing the cylinder to be charged with a mixture of fresh air with the exhaust gases previously retained in the intake manifold. This internal EGR (exhaust gas recirculation) substitutes exhaust products for some of the oxygen and nitrogen containing air in the charge and thereby provides substantial reductions of $NO_x$ emissions in the exhaust products discharged from the engine each cycle.

In an engine with electronic fuel injection control, a controlled small fuel charge may additionally be injected late in the expansion stroke. This will increase the cylinder pressure and the back flow of exhaust gases to be trapped in the intake manifold, resulting in controlled greater reduction of $NO_x$ where engine conditions may not otherwise provide the necessary dilution of the intake charge.

The method of $NO_x$ reduction may further be varied by providing for control of engine exhaust backpressure. A variable geometry turbocharger may be used for this purpose, if available, however other backpressure control devices may alternatively be provided. Modulation of exhaust backpressure could allow closer control of the retained exhaust gases (combustion products) and thus provide a desired degree of $NO_x$ reduction consistent with most efficient operation of the engine.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An intake cam for a diesel engine, the cam comprising:
   a base circle;
   a trapping lobe, a dwell portion, and a main lobe extending in sequence from the base circle;
   the trapping lobe projecting a low height from the base circle of the cam configured to provide an associated intake valve with only a small lift during a portion of an exhaust event in an engine cycle, whereby the valve is opened sufficiently to allow exhaust flow past the intake valve into an intake charge;
   the dwell portion lying adjacent the trapping lobe and projecting slightly beyond the base circle a minimum height to maintain the associated intake valve nearly closed during the dwell portion prior to the end of the exhaust cycle; and
   the main lobe lying adjacent the dwell portion and projecting a maximum height from the base circle to fully lift the associated intake valve during an intake event of an engine cycle.

2. A cam as in claim 1 wherein the base circle has an angular extent of from between 120 degrees to 200 degrees.

3. A cam as in claim 1 wherein the trapping lobe has an angular extent of from 30 degrees to 100 degrees.

4. A cam as in claim 1 wherein the main lobe has an angular extent of from 80 degrees to 160 degrees.

5. A cam as in claim 1 wherein the dwell portion between the trapping and main lobes has an angular extent of from 10 degrees to 60 degrees.

6. A cam as in claim 1 wherein the height of the trapping lobe above the base circle lies in a range of from 10 percent to 40 percent of the height of the main lobe.

7. A cam a in claim 1 wherein the height of the dwell portion above the base circle lies in a range of from 1 percent to 10 percent of the height of the main lobe.

* * * * *